Dec. 2, 1924.

W. CUPPER

SPLASHGUARD

Filed Dec. 28, 1922

1,517,406

Inventor:
William Cupper,
by his attorney, Charles L. Gooding

Patented Dec. 2, 1924.

1,517,406

UNITED STATES PATENT OFFICE.

WILLIAM CUPPER, OF SOUTH HINGHAM, MASSACHUSETTS.

SPLASHGUARD.

Application filed December 28, 1922. Serial No. 609,486.

*To all whom it may concern:*

Be it known that I, WILLIAM CUPPER, a citizen of the United States, residing at South Hingham, in the county of Plymouth and State of Massachusetts, have invented new and useful Improvements in Splashguards, of which the following is a specification.

This invention relates to a side splash mudguard for vehicle wheels and has for its object to provide a mudguard of the character mentioned which may be suspended from the hub of a wheel in a position to intercept mud or water splashed laterally outwardly from said wheel.

The invention consists in the combination and arrangement of parts set forth in the following specification and particularly pointed out in the claims thereof.

Referring to the drawings.

Like numerals refer to like parts throughout the several views of the drawings.

Figure 1:
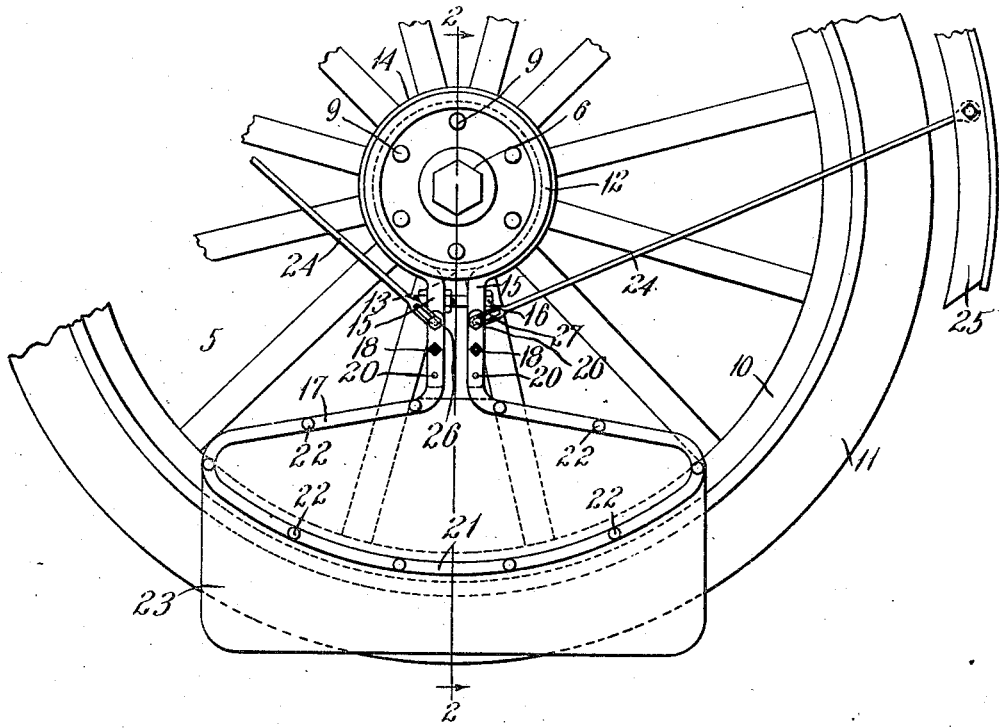
Figure 1 represents a side elevation of a portion of a vehicle wheel, a device embodying the invention being illustrated attached thereto.
Figure 2:
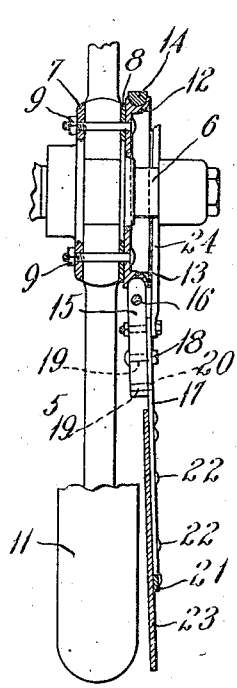
Fig. 2 is a central vertical section taken on the line 2—2 of Fig. 1, portions of the wheel being illustrated in elevation.

In the drawings, 5 represents a wheel embodying therein a hub 6, a flange 7 formed integral with said hub, a detachable flange 8 and bolts 9, the latter securing the detachable flange 8 and spokes of the wheel to the hub 6 in the usual well known manner. The wheel 5 is provided with the usual rim 10 and tire 11. Rigidly fastened to the wheel 5 and secured against the outer face of the detachable flange 8 by means of the bolts 9 is an annular member 12 which is provided with a groove 13 extending around the periphery thereof. Loosely mounted within the groove 13 of the member 12 is a yoke 14, the latter extending around the member 12 and terminating with two parallel arms 15 which extend from the member 12 downwardly. A bolt 16 extends between the arms 15 of the yoke 14 and acts to hold said yoke within the groove 13 of the member 12 by preventing said arms from spreading, and said bolt may also be utilized to force said arms 15 toward each other thereby tightening said yoke upon said member and compensating for the wear therebetween.

Fastened to the arms 15 of the yoke 14 is a frame 17, the latter being secured to said arms by a plurality of bolts 18 which pass through holes 19 formed in said arms. There are a plurality of sets of these holes 19 provided in the arms 15 and the height of the frame 17 may be varied as desired by utilizing either of these sets of holes in securing the frame 17 to the member 12. The frame 17 is also provided with sets of holes 20 which align with the holes 19 in the arms 15. The frame 17 embodies therein a segmental-shaped outer portion 21 which is positioned adjacent to the rim 10 of the wheel 5 and fastened to said frame by a plurality of rivets 22 is a shield 23, preferably constructed of leather, or some other suitable flexible sheet material and said shield is of sufficient area to intercept the mud or water which may be splashed laterally outwardly by the wheel 5 as it passes over the ground. In order to prevent the yoke 14 and parts suspended therefrom from swinging upon the member 12 a pair of braces 24 are provided and the upper end of each of said braces is fastened in any suitable manner to a mudguard 25 located above the wheel 5 or to any other suitable portion of the body of the vehicle, while the lower end of each of said braces is secured to the yoke 14 by a bolt 26 which projects through the holes 20 and 19 of the frame 17 and arms 15 respectively and through a slot 27 provided in said brace, thereby allowing for the relative movement between the wheels and the body of the vehicle permitted by the springs of said vehicle.

Where the splash guard is mounted upon the front wheel of a vehicle, a flexible member as, for example, a chain is provided in place of the rigid braces 24 in order to permit the forward wheels of the vehicle to be moved in steering said vehicle.

A guard suspended as described adjacent to each of the wheels of a vehicle provides an effective barrier to prevent the mud and water from being splashed laterally outwardly from the wheels as they pass through puddles or wet places along the roadway.

I claim:

1. A side splash mudguard for a vehicle wheel comprising, in combination, an annular member adapted to be rigidly fastened to a hub flange of a wheel, said member being provided with a groove extending around the periphery thereof, a yoke loosely mounted upon said member within said groove and embodying therein a pair of downwardly projecting arms, means to force said arms toward each other to compensate for wear between said yoke and said member, a frame fast to said arms and adjustable vertically thereon and a shield fast to said frame and located adjacent to the ground at the side of said wheel.

2. In combination, a vehicle wheel embodying therein a hub provided with a flange formed integral therewith, an annular member rigidly fastened to said hub flange, said member being provided with a groove extending around the periphery thereof, a yoke loosely mounted upon said member within said groove, means to adjust said yoke upon said member, a frame fast to said yoke and adjustable vertically thereon and a shield fast to said frame and located adjacent to the ground at the side of said wheel.

3. In combination, a vehicle wheel embodying therein a hub provided with a flange formed integral therewith, an annular member rigidly fastened to said hub flange, said member being provided with a groove extending around the periphery thereof, a yoke loosely mounted upon said member within said groove, means to adjust said yoke upon said member, a frame fast to said yoke and adjustable vertically thereon, a shield fast to said frame and located adjacent to the ground at the side of said wheel and means to brace said yoke to prevent the latter from rotating upon said member.

In testimony whereof I have hereunto set my hand in presence of two subscribing witnesses.

WILLIAM CUPPER.

Witnesses:
FRANKLIN E. LOW,
HAZEL F. LA MUDGE.